(12) United States Patent
Maillard et al.

(10) Patent No.: US 6,666,014 B2
(45) Date of Patent: Dec. 23, 2003

(54) TWO-LEVEL PRESSURIZATION VALVE CONTROLLED BY A FUEL METERING UNIT

(75) Inventors: Claude Maillard, Vulaine sur Seine (FR); David Maillard, Bois le Roi (FR); Alain Garassino, Crisenoy (FR)

(73) Assignee: SNECMA Moteurs, Paris (FR)

( * ) Notice: Subject to any disclaimer, the term of this patent is extended or adjusted under 35 U.S.C. 154(b) by 42 days.

(21) Appl. No.: 10/006,709

(22) Filed: Dec. 10, 2001

(65) Prior Publication Data

US 2002/0078678 A1 Jun. 27, 2002

(30) Foreign Application Priority Data

Dec. 22, 2000 (FR) .................................. 00 16895

(51) Int. Cl.$^7$ ................................................ F02C 9/26
(52) U.S. Cl. .................................................. 60/39.281
(58) Field of Search ............................ 60/39.281, 734

(56) References Cited

U.S. PATENT DOCUMENTS 2,958,376 A * 11/1960 Williams .................. 60/39.281
3,246,682 A * 4/1966 McCombs ............... 60/39.281
4,263,838 A  4/1981 St. Laurent, Jr.

FOREIGN PATENT DOCUMENTS

EP  0 915 241 A2  5/1999
FR  2610040  1/1987

* cited by examiner

Primary Examiner—Louis J. Casaregola
(74) Attorney, Agent, or Firm—Obln, Spivak, McClelland, Maier & Neustadt, P.C.

(57) ABSTRACT

A fuel injection system in a turbomachine, the system comprising a high pressure pump for pressurizing the fuel coming from a fuel tank to a high pressure P1, a plurality of fuel injectors disposed in a combustion chamber of the turbomachine, and a metering unit interposed between said high pressure pump and said plurality of injectors to control the rate at which fuel flows into the injectors from the high pressure pump, wherein said metering unit comprises a pressurization valve piloted to occupy two pressure levels by means of a metering valve fed with fuel from said high pressure pump. A solenoid stop valve for acting on the pressurization valve is also provided to interrupt the feed of fuel to the injectors.

4 Claims, 2 Drawing Sheets

TWO-LEVEL PRESSURIZATION VALVE CONTROLLED BY A FUEL METERING UNIT

FIELD OF THE INVENTION

The present invention relates in general to fuel injection systems in turbomachines.

PRIOR ART

The fuel injection system in a turbomachine comprises a high pressure pump for pressurizing the fuel coming from a fuel tank, a plurality of fuel injectors disposed in a combustion chamber of the turbomachine, and interposed between those two sets of elements, a fuel metering unit for controlling the rate at which fuel is to flow into the injectors from the high pressure pump.

Conventionally, the metering unit comprises both a stop valve for ensuring that fuel is delivered to the injectors only once a predetermined minimum pressure has been reached, and also means for adjusting the flow rate of the fuel, which adjustment means come into action above said minimum pressure as a function of various parameters concerning the turbomachine as supplied by a computer. French patent application No. 2 718 190 filed by the Applicant describes one such conventional system. During the stage of starting the turbomachine, fuel is pumped from the tank and is sent towards the metering unit. Once the minimum pressure has been reached, the adjustment means are activated and the stop valve opens, thereby delivering fuel to the injectors. It is then possible to control the flow rate continuously as a function of engine parameters by acting on the adjustment means.

Although that injection system gives general satisfaction, it nevertheless presents certain drawbacks. In particular, it takes no account of the turbomachine operating at different speeds, which can lead to certain components of the system being overdimensioned and to a harmful increase in fuel temperature.

OBJECT AND DEFINITION OF THE INVENTION

The present invention seeks to mitigate those drawbacks with an injection system that limits fuel heating and that enables its components to be dimensioned optimally.

These objects are achieved by a fuel injection system in a turbomachine, the system comprising a high pressure pump for pressurizing the fuel coming from a fuel tank to a high pressure P1, a plurality of fuel injectors disposed in a combustion chamber of the turbomachine, and a metering unit interposed between said high pressure pump and said plurality of injectors to control the rate at which fuel flows into the injectors from the high pressure pump, wherein said metering unit comprises a pressurization valve piloted to occupy two pressure levels by means of a metering valve fed with fuel from said high pressure pump.

With these two pressure levels controlled by the metering unit valve, the pressure in the fuel circuit is limited at low flow rates, and maximum pressure is used only when the turbomachine is consuming high flow rates.

The pressurization valve comprises a first end inlet connected to a first load outlet of said metering valve, and a second end inlet opposite said first end inlet and connected firstly to said high pressure pump via a first diaphragm and secondly to a second load outlet of said metering valve via a third diaphragm, fuel feed to said injectors connected to a pilot outlet of said pressurization valve resulting from the unbalance in the pressures applied to the two end inlets thereof under the control of a computer.

Preferably, the metering valve comprises a hydraulic slide which can be moved linearly under the control of said computer and having two annular grooves serving to establish communication respectively between a first feed inlet and said first load outlet, and secondly between a second feed inlet and said second load outlet.

Advantageously, the metering unit further comprises a solenoid stop valve for acting on said pressurization valve to interrupt the fuel feed to said injectors. Said solenoid stop valve comprises a first inlet connected to said high pressure pump, a second inlet connected to low pressure P2 via a second diaphragm, and an outlet connected to said second end inlet of the pressurization valve.

BRIEF DESCRIPTION OF THE DRAWINGS

The characteristics and advantages of the present invention appear better from the following description given by way of non-limiting indication, and with reference to the accompanying drawings, in which.

DETAILED DESCRIPTION OF A PREFERRED EMBODIMENT

Figure 1:
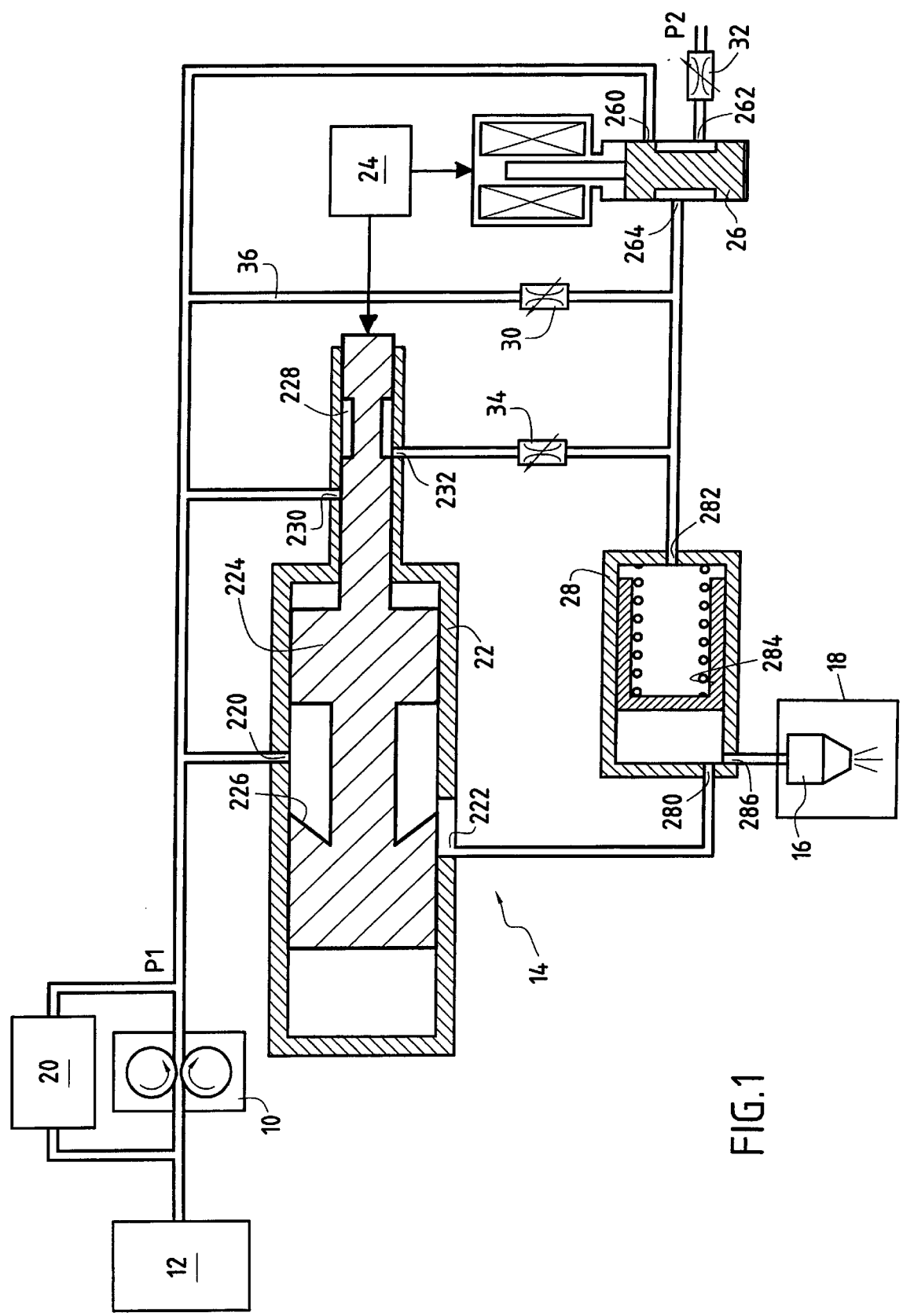
FIG. 1 is a diagrammatic view of a fuel injection system of the present invention in a first position.
Figure 2:
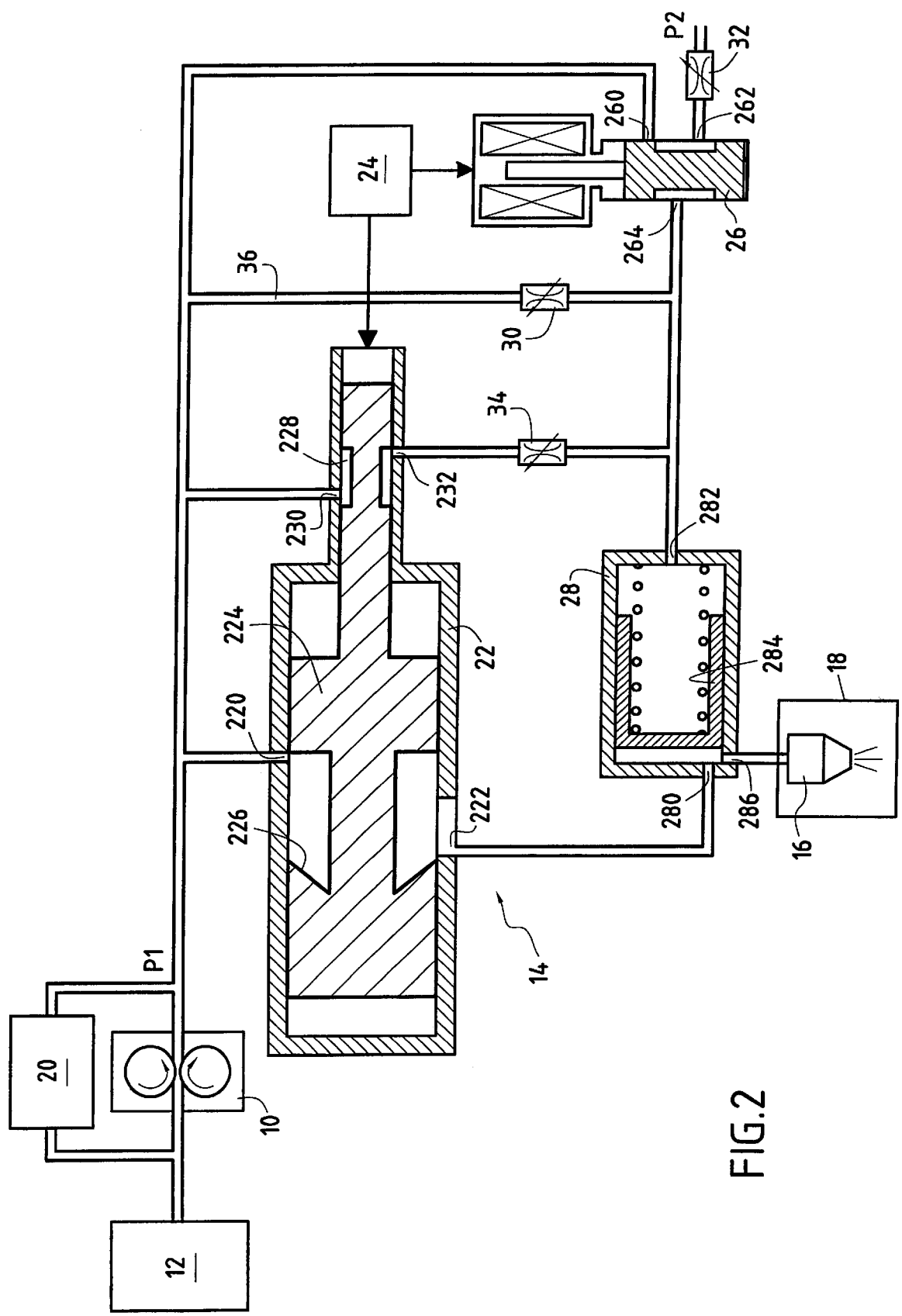
FIG. 2 is a diagrammatic view of a fuel injection system of the present invention in a second position.

A fuel injection system of a turbomachine of the invention is shown diagrammatically in FIGS. 1 and 2.

There can be seen a high pressure (HP) fuel pump 10 which draws fuel from a fuel tank 12 to deliver it via a fuel metering unit 14 to injectors 16 of a combustion chamber 18 of a turbomachine. A bypass type valve 20 is connected in parallel with the HP pump to recycle the excess fuel it delivers. The high pressure HP at the outlet from the high pressure pump 10 is referenced "P1".

The metering unit is constituted by three elements connected together in a "triangle" configuration with a metering valve proper 22 having a first feed inlet 220 connected to the outlet of the high pressure pump 10 and serving to adjust the flow rate of the fuel as a function of operating parameters of the turbomachine as supplied by a computer 24 to which it is connected, a solenoid stop valve 26 having a first inlet 260 also connected to the outlet of said high pressure pump (a second inlet 262 thereof being connected to low pressure LP referred to as "P2") and which is for interrupting fuel feed to the injectors under the control of the computer 24 to which it is also connected, and a pressurization valve 28 having a first end inlet 280 connected to a first load outlet 222 of the metering valve, and a second end inlet 282 at the end opposite to the first end inlet connected to an outlet 264 of the solenoid stop valve.

The metering valve contains a hydraulic slide 224 which can move linearly under the control of the computer 24. This slide has two annular grooves 226, 228. The first groove 226 is for metering the fuel which is received through the first feed inlet 220 and which is delivered through the first load outlet 222. The second groove 228 provides communication between a second feed inlet 230 connected to the outlet of the high pressure pump 10, and a second load outlet 232 connected to the second end inlet 282 of the pressurization valve 28.

By causing a hydraulic slide 284 of the pressurization valve to move, any unbalance in the pressures applied to the two end inlets 280 and 282 will act on the fuel delivered by a pilot outlet 286 of this valve which is connected directly to the injectors 16 of the combustion chamber 18.

According to the invention, the pressurization valve has two pressurization levels that depend on the speed of the turbomachine: a high pressure and a low pressure. The high pressure corresponds to the high level of pressurization required for ensuring that the turbomachine operates while cruising (operating at high flow rates), while the low level corresponds to pressurization at a level that is just sufficient to enable the turbomachine to operate while starting and while taxiing on the ground (operation at low flow rates).

The high pressurization level at high speeds is much too great and in general inappropriate while the engine is running at low speed (idling), and this leads in particular to fuel leakage. By reducing the pressurization level at low speeds, leaks are limited and recirculation heating in the bypass valves is reduced.

These two pressurization levels of the valve 28 are obtained by means of three diaphragms 30, 32, 34. The first diaphragm 30 is placed on a duct connected in parallel with the solenoid stop valve 26 being connected to the outlet of the high pressure pump 10 and to the second end inlet 282 of the pressurization valve 28, the second diaphragm 32 is placed at the second inlet 262 of the solenoid stop valve 26, and the third diaphragm 34 is placed between the second load outlet 232 of the metering valve 22 and, again, the second end inlet 282 of the pressurization valve 28.

Normal operation of the injection system is as follows. It should be observed that when the solenoid stop valve 26 is active (not shown), it admits the high pressure P1, thereby obliging the pressurization valve to close (take up a stop position) under the action of said pressure which is then applied directly to its second end inlet 282.

At low fuel flow rates, the slide 224 of the metering valve is in the position shown in FIG. 1 where it closes the first feed inlet 230. The third diaphragm 34 is thus isolated from the pressure P1 and the pressure at the second end inlet 282 of the pressurization valve is determined by the first diaphragm 30 as fed with the pressure P1 and by the second diaphragm 32 as connected to the low pressure P2. This gives rise to a low level of pressure downstream from the valve 28 which is given by the following relationship:

$$P_{down} - P2 = (P1-P2)/[1+(K2/K1)^2]$$

where K1 and K2 are the gains respectively of the first and second diaphragms.

At high flow rates, the slide 224 of the metering valve is in the position shown in FIG. 2, thereby opening the first feed inlet 230 to the pressure P1. The third diaphragm 34 is thus connected to the pressure P1 and the pressure at the second end inlet 282 of the pressurization valve is determined by the first and third diaphragms 30 and 34 which are fed by the pressure P1 and by the second diaphragm 32 which remains connected to the low pressure P2. This gives rise to a high level of pressure downstream from the valve 28 given by the following relationship:

$$P_{down} - P2 = (P1-P2)/[1+(K2)^2/(K1+K3)^2]$$

where K1, K2, and K3 are the gains of the first, second, and third diaphragms, respectively.

The configuration of the invention is particularly advantageous since it makes it possible:

to re-light in flight with the HP pump at the full throttle position;

to reduce recirculation heating in the critical idling zone (reduction in recirculation flow rates and pressures); and to dimension the various actuators optimally, which actuators have high pressure available when necessary (thus enabling their cylinder capacity and weight to be reduced).

The invention also means that a smaller flow rate is required of the high pressure pump, giving rise to better pump efficiency and thus enabling a pump of smaller dimensions to be used, thus reducing excess flow rate during idling.

What is claimed is:

1. A fuel injection system in a turbomachine, the system comprising:

a high pressure pump for pressurizing fuel coming from a fuel tank to a high pressure;

a plurality of fuel injectors disposed in a combustion chamber of the turbomachine; and a metering unit interposed between said high pressure pump and said plurality of injectors to control the rate at which fuel flows into the injectors from the high pressure pump, wherein said metering unit comprises a pressurization valve and a metering valve, the metering valve being configured to control a flow of fuel from the high pressure pump to the pressurization valve to selectively provide at least two pressure levels to the pressurization valve, and wherein the pressurization valve comprises a first end inlet connected to a first load outlet of the metering valve, and a second end inlet opposite the first end inlet and connected firstly to the high pressure pump via a first diaphragm and secondly to a second load outlet of the metering valve via a second diaphragm, whereby fuel fed to said injectors connected to a pilot outlet of the pressurization valve is controlled by providing an unbalance in pressures applied to the two end inlets of the pressurization valve under control of a computer.

2. A fuel injection system according to claim 1, wherein said metering valve comprises a hydraulic slide which can be moved linearly under the control of said computer and having two annular grooves serving to establish communication respectively between a first feed inlet and said first load outlet, and secondly between a second feed inlet and said second load outlet.

3. A fuel injection system according to claim 1, wherein said metering unit further comprises a solenoid stop valve for acting on said pressurization valve to interrupt the fuel feed to said injectors.

4. A fuel injection system according to claim 3, wherein said solenoid stop valve comprises a first inlet connected to said high pressure pump, a second inlet connected to a low pressure via a third diaphragm, and an outlet connected to said second end inlet of the pressurization valve.

* * * * *